Figures 1, 2:
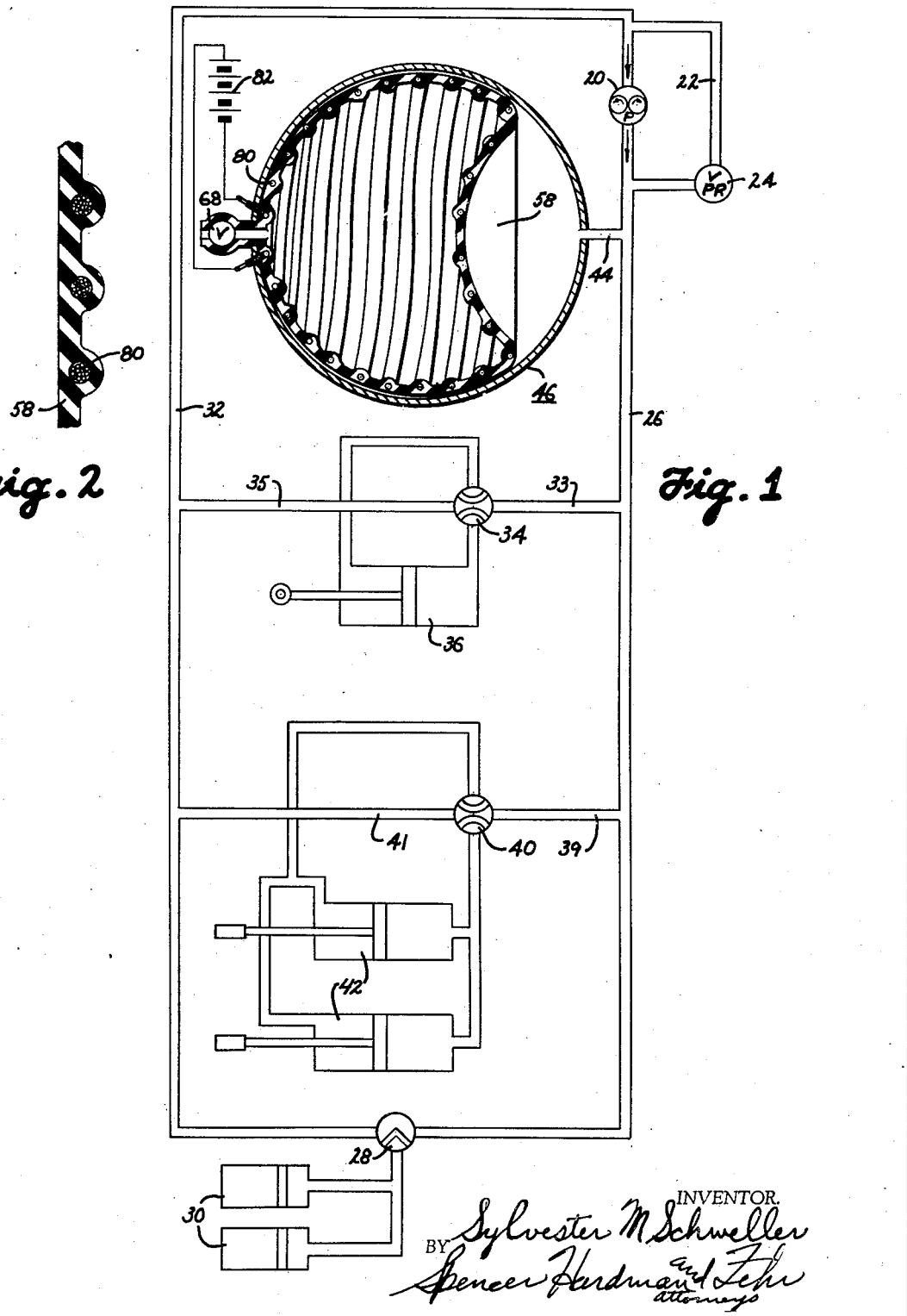

Oct. 17, 1944.   S. M. SCHWELLER   2,360,590
PRESSURE TANK
Filed Nov. 30, 1942

INVENTOR.
Sylvester M. Schweller
BY Spencer Hardman and Fehr
attorneys

Patented Oct. 17, 1944

2,360,590

UNITED STATES PATENT OFFICE 2,360,590

PRESSURE TANK

Sylvester M. Schweller, Dayton, Ohio, assignor to General Motors Corporation, Dayton, Ohio, a corporation of Delaware Application November 30, 1942, Serial No. 467,433

1 Claim. (Cl. 138—30)

This invention relates to pressure tanks for hydraulic pressure systems now widely used in large airplanes but which are capable of use in practically any pressure system.

Hydraulic systems employing pressure tanks are commonly used for many things including actuation of airplane control devices and landing gears. The United States Air Force specifications for the pressure tanks of such systems are very severe. They require that the pressure tanks be able to stand ten thousand cycles at normal temperatures, one thousand cycles at elevated temperatures and a thousand cycles at −40° F. These specifications are deemed necessary because airplanes are subjected at high altitudes to very low temperatures, and to high temperatures while on the ground in deserts and other hot regions. At low temperatures the hydraulic fluid in the pressure tanks becomes viscous and the flexible wall in the pressure tanks becomes stiff, brittle and subject to breakage and damage.

It is an object of my invention to protect the pressure tank or accumulator from the effects of low temperatures.

It is another object of my invention to prevent the flexible wall from becoming stiff and brittle.

It is still another object of my invention to prevent the hydraulic fluid in the accumulator from becoming viscous during low temperature conditions.

Generally speaking, these objects are attained by providing some means for heating the pressure tank. For an example an electric heating element is embedded in the flexible wall which may be connected to a source of electric energy whenever the pressure tank is likely to be subjected to low temperatures.

Further objects and advantages of the present invention will be more apparent from the following description, reference being had to the accompanying drawing, wherein a preferred form of the present invention is clearly shown.

In the drawing:

Figure 1 is a sectional view, partly diagrammatic, of a pressure tank embodying my invention, together with a diagrammatic representation of some of the remaining elements of a hydraulic pressure system for airplanes; and Figure 2 is an enlarged sectional view of the flexible wall showing the disposition of the heating element therein.

Referring now to the drawing, there is shown diagrammatically, for the purpose of illustrating one of the most important applications of the invention, a hydraulic system for an airplane including a gear pump 20, normally driven by one of the engines of an airplane. This pump pumps a suitable hydraulic fluid, such as oil, from the low pressure or discharge line 32 into the high pressure supply line 26. A by-pass 22 connects the discharge side of the pump with the intake side and is provided with the pressure relief valve 24 which will open the by-pass at some suitable pressure, such as 1000 lbs. or 1500 lbs. per square inch.

The supply line 26 connects with the three-way valve 28 which connects the interior of the brake cylinders 30 with either the high pressure supply line or the discharge line 32 which connects with the intake side of the pump. To apply the brakes of the airplane, the valve 28 is turned so that the high pressure line 26 is connected to the brake cylinders 30 to press the brake shoes against the brake drums upon the landing wheels. When the brakes are to be released, the valve 28 is turned so that the interior of the cylinders are connected to the discharge line 32.

A branch supply line 33 connects with the four-way valve 34 which in turn connects with the branch discharge line 35. This four-way valve 34 controls the connection of either end of the wing flap cylinder 36 with the supply line while the other end of the cylinder will then be connected to the discharge line. This will operate the wing flaps to any position desired.

The branch supply line 39 connects to a four-way valve 40 which in turn is connected by the branch discharge line 41 to the main discharge line 32. This four-way valve will connect the supply line 26 with the upper ends of the landing gear cylinders 42 and the lower ends of the cylinders to the discharge line 32 in order to lower the landing gear. In order to raise the landing gear, the four-way valve 40 is reversed so that the lower ends of the landing gear cylinders are connected to the supply line 26 while the upper ends are connected to the discharge line 32.

Inasmuch as the capacity of the pump 20 is comparatively small and it is desired that the pistons in the various operating cylinders move rapidly, it has been customary to provide a pressure tank or accumulator to maintain an adequate supply of hydraulic fluid under pressure when these demands are imposed upon the system. For this purpose a line 44 connects to the pressure tank or accumulator 46. Within the walls of the tank there is provided a flexible diaphragm or bladder 58. This bladder is made of a synthetic rubber-like material and has a standard inlet check valve 68 extending outside of the tank through which the interior of the bladder may be provided with an adequate supply of air or other gas.

When the pressure tank and the hydraulic system are subjected to the low temperature test, or when the airplane is flying at high altitudes or northern climates where very low temperatures are encountered, the hydraulic fluid, particularly in the pressure tank 46, tends to become very viscous. Also rubber and rubber-like materials tend to become quite stiff and brittle at low temperatures. In fact the temperatures do not need to be extremely low before the flexibility and elasticity of the material are greatly reduced. Such conditions therefore cause rather severe damage to the bladder when the system is operated at low temperatures.

According to my invention in order to protect the pressure tank from the effects of the low temperatures, I heat the tank electrically whenever the tank is likely to be subjected to low temperatures. There are many ways in which this can be done, but the way which I have chosen is to provide a single electrical heating element 80 which is formed of stranded coiled electrical resistance wire and embedded in the bladder or flexible wall. Preferably the two insulated terminals of the heating element are adjacent the valve 68, and the heating element in the form of a loop extends with its two sides parallel to each other in separate beads in a spiral path up to the upper or other pole of the bladder. The two ends of this heating element are connected whenever the pressure tank is likely to be subjected to low temperatures, to a suitable source of electrical energy, such as a battery 82. Not a great deal of electric energy or heating is required to raise the temperature of the diaphragm and the accumulator to a temperature where it can operate without more than ordinary wear and tear.

In this way the life of the bladders or flexible walls is greatly increased and failures are greatly reduced. It, of course, is not necessary that the heating element be incorporated in the flexible wall although this method applies the heat most directly to the flexible wall which requires the most heat, and this method also provides an excellent method for heating the hydraulic fluid within the pressure tank. Also the bladder, since it is made of rubber-like material, serves as an insulator for the heating elements. However, if desired, the heating elements may be placed on the inside or the outside of the wall of the tank or some other method may be used if desired.

While the form of embodiment of the invention as herein disclosed, constitutes a preferred form it is to be understood that other forms might be adopted, all coming within the scope of the claim which follows.

What is claimed is as follows:

In a hydraulic pressure system which may be subject to low temperatures, a pressure tank provided with a wall capable of withstanding internal pressure, an elastic wall dividing the interior of the tank into a primary chamber and a secondary chamber, the primary chamber containing fluid under pressure, the wall of the tank being provided with a port connecting the secondary chamber with the hydraulic system, a flexible electric heating means embedded in said flexible wall, and means for passing electric energy through said heating means.

SYLVESTER M. SCHWELLER.